United States Patent [19]

Bajgert et al.

[11] 3,731,289

[45] May 1, 1973

[54] CLEANING APPARATUS AND METHOD IN A MAGNETIC TAPE UNIT

[75] Inventors: Teddy A. Bajgert, Boulder; William J. Schaffer, Loveland, both of Colo.

[73] Assignee: International Business Machines Corporation, Armonk, N.Y.

[22] Filed: Feb. 11, 1972

[21] Appl. No.: 225,441

[52] U.S. Cl. ..........340/174.1 R, 15/93, 340/174.1 B

[51] Int. Cl. ..........G11b 27/36

[58] Field of Search ..........340/174.1 B, 174.1 H, 340/174.1 G

[56] References Cited

UNITED STATES PATENTS

| | | | |
|---|---|---|---|
| 3,633,187 | 1/1972 | Procror | 340/174.1 B |
| 3,359,548 | 12/1967 | Yoshii et al. | 340/174.1 B |
| 2,861,133 | 11/1958 | Herr | 179/100.2 |
| 2,905,767 | 9/1959 | Eckert, Jr. et al. | 179/100.2 |
| 3,449,528 | 6/1969 | Camras | 179/100.2 |
| 3,069,815 | 12/1962 | Valentine | 51/185 |

*Primary Examiner*—Vincent P. Canney
*Attorney*—Francis A. Sirr et al.

[57] ABSTRACT

Automatic head/tape cleaning apparatus wherein a cleaning member is selectively positioned in the head/tape transducing interface. The tape tension, normally effective to hold the tape to the head during read/write operation, is effective to hold the cleaning member against the head when it is in operative cleaning position. The movement of the cleaning member to its operative position at the transducing interface is automatically accomplished as part of read-after-write error detection, as part of read error detection, and as a result of high speed tape movement.

29 Claims, 13 Drawing Figures

Patented May 1, 1973 3,731,289

4 Sheets-Sheet 2

CLEANING APPARATUS AND METHOD IN A MAGNETIC TAPE UNIT

BACKGROUND AND SUMMARY OF THE INVENTION

The present invention is concerned with the general field of cleaning, and more specifically with the cleaning of magnetic tape and/or the cleaning of a magnetic transducer or head of a magnetic tape transport.

While magnetic tape transports may take a variety of structural configurations, they universally provide some means, for example a capstan, to move the oxide transducing surface of the magnetic tape past a magnetic transducer or head, to read or write data, while the tape is force-biased toward the head. This force-bias may be accomplished by means of a tape tension force, or by means of a pressure pad or the like which holds the tape against the head in transducing relationship. Tape transports are associated with other equipment to form an operating system. For example, if the other equipment is a digital computer the data is binary data in the form of electrical signals. During the write process, these electrical signals are supplied to the head and are transduced to storable magnetic states in the tape's oxide surface. Once the electrical data signals have been so stored, they can be recovered or read by again moving the tape past the head. During the read process, the magnetic states in the tape's oxide surface are transduced to electrical signals for use by the computer.

During the read/write process, the tape's oxide and foreign material, such as dust, tend to accumulate on the surface of the magnetic head. This accumulation tends to contaminate the head and degrade the transducing action at the head/tape interface.

One solution to this problem, of course, is to periodically shut down the tape transport and manually clean the head with a brush and solvent.

The disadvantages of manual intervention are recognized in the prior art and a number of alternative solutions have been proposed. For example, it has been proposed that the tape transport be operated periodically with a cleaning tape replacing the magnetic tape, or with the magnetic tape itself carrying a length of cleaning tape.

Other prior art discloses a tape transport wherein the head periodically moves out of operative relation with the tape, and in so moving it passes a wiper or brush designed to clean the head.

Yet other prior art suggests that head contamination can be reduced by cleaning the tape, continuously or intermittently, at a position spaced from the head. This tape cleaning has been accomplished by a scraper-type cleaner and by a moving band of polishing tape which burnishes the tape's oxide surface.

Prior art automatic head cleaning requires special tapes, or movement of the head to a cleaning wiper. The present invention achieves automatic head/tape cleaning while using conventional magnetic recording tape and without disturbing the head position or the magnetic tape path components.

Specifically, the present invention cleans the tape and/or the head at the head/tape interface by selectively positioning a cleaning means intermediate the head and the tape at this interface. The force-biasing means which normally holds the tape against the head is effective to hold the cleaning means against the head to aid in cleaning the transducing surface of the head. When not in use, the cleaning means does not disturb the head/tape interface or the tape path components.

As a feature of the present invention, the cleaning means may be moved relative to the transducing surface to better accomplish the cleaning function. The cleaning means may take the form of a cleaning web or ribbon having one cleaning surface engaging the head and having a second cleaning surface engaging the tape's oxide surface, to thereby clean both the head's transducing surface and at least a portion of the tape.

As a further feature of the present invention, the automatic head/tape cleaning means may be selectively used as part of an error detection and correction procedure. As is well known, magnetic tape transports may include a read-after-write feature to check a write operation. If the write operation has failed, it is normal procedure to move the tape backward and attempt a rewrite. If the rewrite is unsuccessful, the tape may be moved forward and the data written at a position spaced from the failure position. The present invention greatly increases the occurrence of successful rewrites by instituting operation of the automatic head/tape cleaner, to clean both the head and the section of tape associated with the write failure.

Another known error detection and correction procedure is that of read checking. If while reading tape a read error is detected the tape is normally stopped, momentarily reversed in direction, and an attempt is made to re-read, perhaps with greater force-bias means, such as tape tension, forcing the tape against the head. As yet a further feature of the present invention, the automatic head/tape cleaning means is operated to clean the tape and/or the head prior to re-read.

Yet a further feature of the present invention is associated with high speed tape movement, for example high speed rewind. As is well known, high speed tape movement can produce excessive head wear. Thus, the prior art provides various means to hold the tape away from the head during this high speed tape movement. The present invention accomplishes this function by moving the cleaning means into operative position at the head/tape interface. Now, not only is the head cleaned, but the tape is also cleaned as the tape moves in the high speed mode, spaced from the head.

The foregoing and other features and advantages of the invention will be apparent from the following more particular description of the preferred embodiments of the invention, as illustrated in the accompanying drawing.

DESCRIPTION OF THE PREFERRED EMBODIMENTS

Figure 1:
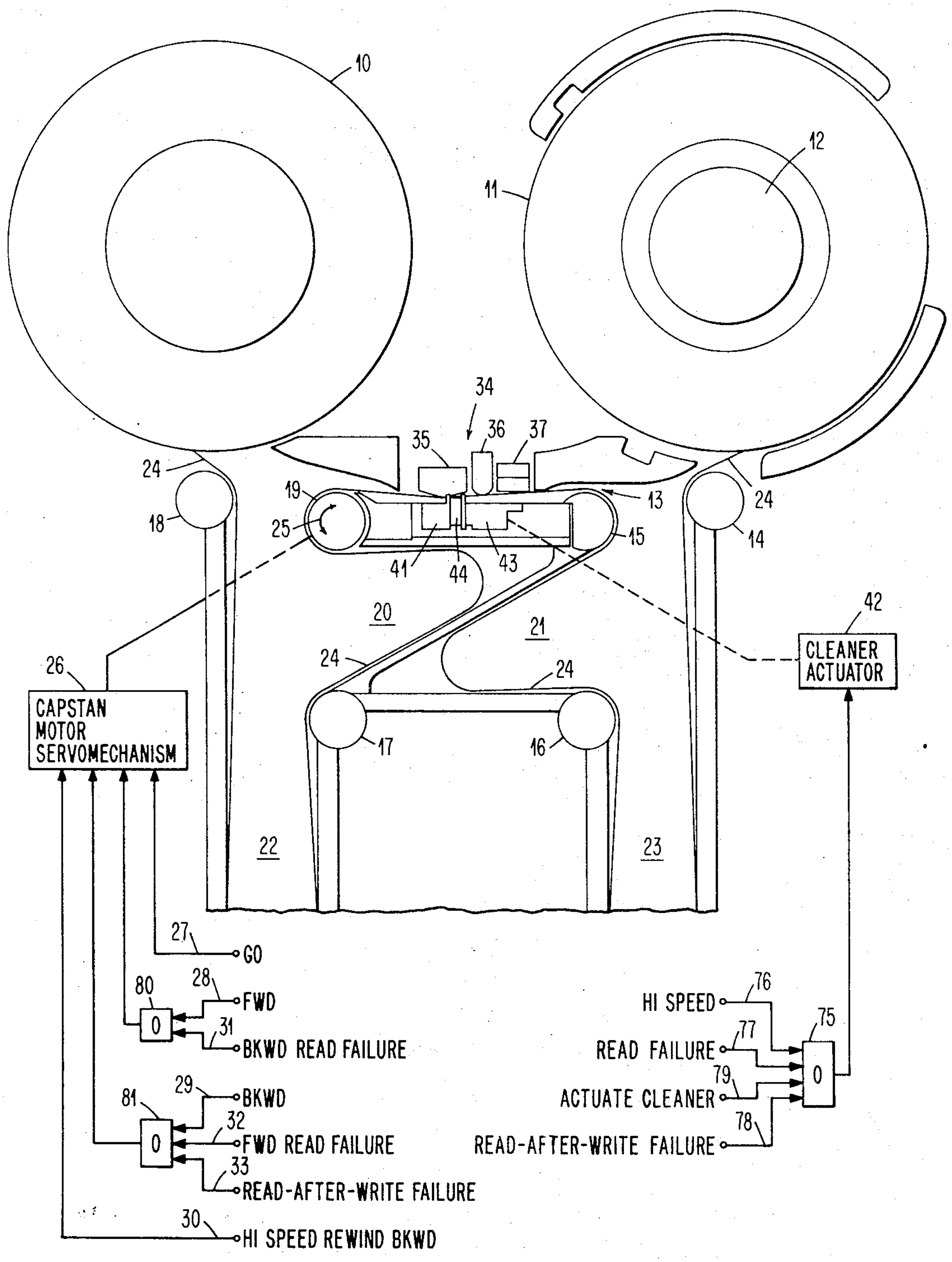
FIG. 1 is a front view of a portion of a magnetic tape unit, showing an embodiment of the cleaning apparatus of the present invention in inoperative position to the right of the read/write head.

This invention will be described with reference to a magnetic tape transport having, among other features, a supply reel, a take-up reel and a capstan to control magnetic tape movement past and through a tape processing station. A typical transport of this type writes data on one-half inch wide magnetic tape while moving the tape in a forward direction from the supply reel to the take-up reel at a constant longitudinal speed of, for example 200 inches per second. The tape processing station may include a number of operable means adapted to cooperate with the tape and subject to operational degradation upon experiencing contamination, for example, a write transducer, a read transducer, an erase transducer, a fixed-position tape cleaner and a beginning-of-tape/end-of-tape (BOT/EOT) sensor. In a typical transport, as the tape moves in a forward direction, it encounters in sequence the BOT/EOT sensor, the tape cleaner, the erase transducer, the write transducer and then a fraction of an inch thereafter the read transducer.

Known error-detection-procedures provide for the reading of data immediately after it is written, known as read-after-write checking. Failure to read the proper data indicates that the write operation has failed. As a result, the tape is stopped and its direction is momentarily reversed to try a rewrite on the same section of tape. If the rewrite is unsuccessful, a write-error is indicated, the tape is moved forward and the data is written on a different section of the tape.

When data-processing of a supply reel of tape has been completed, it is customary to rewind the tape back onto the supply reel at a high speed, for example 800 inches per second.

While the invention will be described with reference to the magnetic recording transducer of such a typical transport, it is not contemplated that the invention, in its broader aspects, be limited thereto. The essence of the present invention is considered to be the cleaning of an operable means, for example the magnetic transducer, by the positioning of a cleaning means at the tape interface therewith. While this cleaning may be accomplished at any time, a feature of the present invention is to institute a cleaning cycle during the above-described rewrite operation, to thus clean both the transducer and that section of the tape associated with the error. As a further feature of the present invention, the cleaning cycle may be instituted during the abovedescribed high speed rewind, to not only perform the cleaning function but to also separate the tape from the transducer during high speed tape movement.

During a read operation, wherein data previously written on tape is recovered for use in a computing system, the amplitude of the read signal from the read transducer is normally monitored as a measure of the integrity of the data being recovered from the tape. Yet a further feature of the present invention provides for the stopping of tape movement when a read error is detected, as for example, by sensing a minimum read signal amplitude. This is followed by the institution of a cleaning cycle while the tape remains stationary, to clean both the transducer and that section of the tape associated with the read error. Thereafter the tape is moved backward a short distance and the data is re-read.

With reference to FIG. 1, a typical magnetic tape transport, of the type above described, is partially shown in front view. Take-up reel 10, also known as a machine reel since it is normally permanently attached to a reel motor, not shown, receives tape 24 from removable supply reel 11. The supply reel, also known as a file reel, is removable from the tape transport and is coupled to a reel motor, not shown, by means of a reel latch 12. Reel latch 12 may be either manually operated or automatic-machine-operated.

The magnetic tape unit of FIG. 1 is of the general type shown in U. S. Pat. No. 3,393,878 issued to J. I. Aweida et al. and incorporates a pneumatically operated self-threading feature for automatically transporting the end of tape from supply reel 11, through a tape threading channel, generally designated by reference numeral 13, to take-up reel 10. Typically, such a tape transport includes air bearings 14–18 and a single bidirectional capstan 19 which continuously engages the magnetic tape. As is well known, once tape 24 has been successfully threaded from the supply reel to the take-up reel, loops of the tape are loaded into the two tapered vacuum columns 20 and 21 and into the two parallel-wall vacuum columns 22 and 23, as shown. The two reel motors may be servo controlled by means of tape loop sensors, not shown, associated with vacuum columns 22 and 23, for example by the means disclosed in U. S. Pat. No. 3,550,878 to J. M. Crisp et al.

During data-processing operation, tape is reversibly driven, as identified by capstan motion arrow 25, by means of a capstan motor servomechanism 26 controlling a high torque/low inertia motor, not shown, which is directly coupled to capstan 19. Typically, such a magnetic tape unit operates in a write mode to write information on the magnetic tape while the tape is moving in a forward direction (the counterclockwise direction of capstan 19) at a relatively slow speed, for example 200 inches per second. The tape unit may also operate in a read mode while the capstan is moving tape in either direction at this relatively slow speed. The tape unit is also capable of operating in a high speed mode wherein tape is driven by the capstan at a relatively high speed, for example 800 inches per second. These various operational modes have been diagrammatically represented by input command lines, including OR gates 80 and 81, connected to capstan motor servomechanism 26. For example, if the mode of operation requires slow forward speed of the motor, command lines 27 and 28 are active. If slow speed backward operation is desired, lines 27 and 29 are active. Lines 27 and 30 place the transport in its high speed rewind mode.

As has been mentioned, possible error-detection procedures include the sensing of a read failure and the sensing of a read-after-write failure. Command lines 31 and 32 provide the required momentary tape movement necessary for rereading in the case of a backward read failure and a forward read failure, respectively. Line 33 provides the required momentary tape movement to rewrite after the sensing of a read-after-write failure.

Reference numeral 34 of FIG. 1 identifies generally the tape processing station. This tape processing station includes a number of operable means adapted to cooperate with the magnetic recording tape, these means being subject to degradation in their performance or operation upon experiencing contamination. The more critical of these means is read/write magnetic transducer means 35. Another of these means is erase transducer 36, while yet another of these means is stationary tape cleaner 37.

Figures 2, 3:
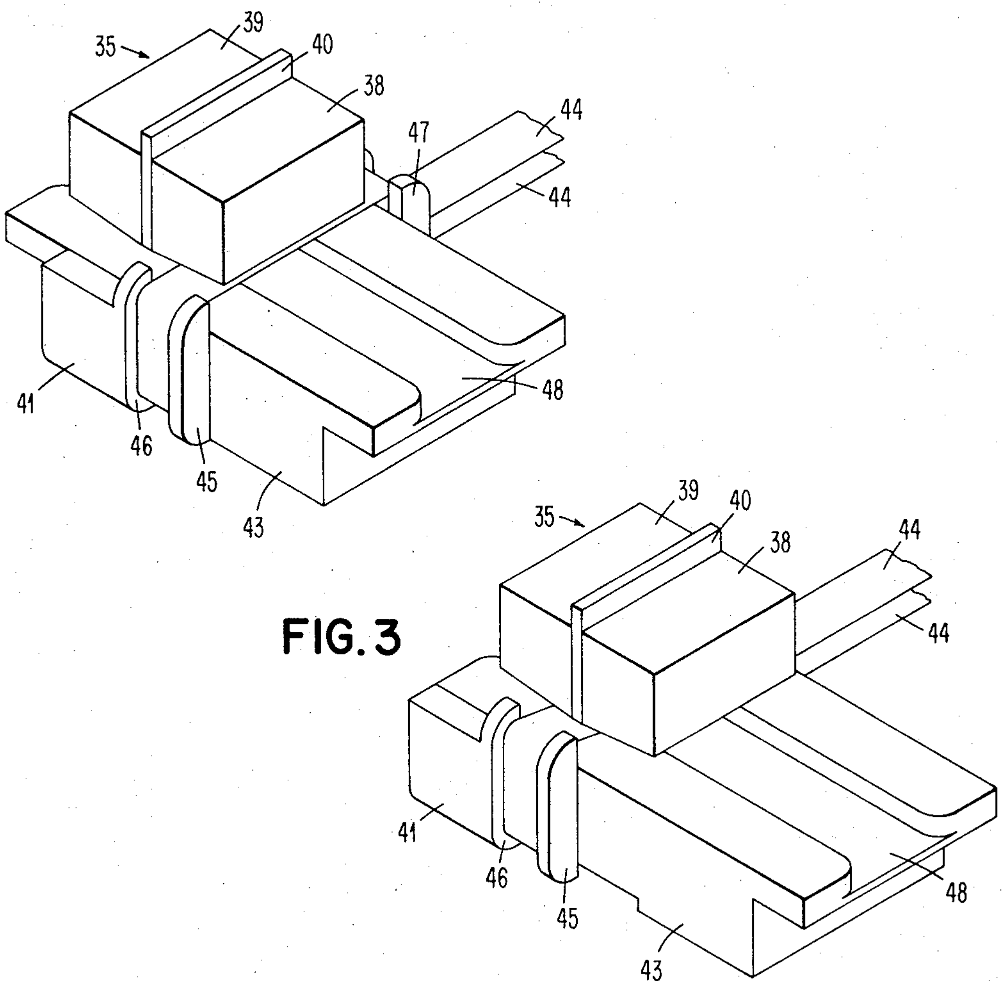
FIG. 2 shows the cleaning apparatus and the head of FIG. 1, showing the loop of cleaning ribbon extending normal to the tape path.
FIG. 3 shows the cleaning apparatus of FIG. 2 in operative association with the read/write head.

With reference to FIG. 2, magnetic transducer means 35 is shown as including a write transducer 38 and a read transducer 39 separated by a shielding member 40. It will be remembered that in the abovedescribed typical tape transport a write operation occurs only when the tape is moving in a forward direction, that is, from right to left in FIGS. 1 and 2. Thus, it can be seen that the advancing tape first encounters tape cleaner 37, then erase transducer 36, followed by write transducer 38 and immediately thereafter by read transducer 39.

The apparatus thus far described is intended to be but one example of a magnetic tape transport with which the present invention finds utility.

Referring again to FIG. 1, reference numeral 43 identifies a stationary member which slidably carries a movable loop forming member 41 whereby the cleaning means of the present invention is supported adjacent transducer means 35 in the vicinity of tape threading channel 13. Member 41 is movable to the left, from the inoperative position shown in FIGS. 1 and 2 to the operative position shown in FIG. 3. Member 41 is moved by cleaner actuator or motor 42. This cleaner actuator may be, for example, a pneumatic motor energized from the source of positive air pressure associated with the above-mentioned air bearings.

Cleaner actuator 42 is operable to move member 41 from the inoperative FIG. 2 position to the operative FIG. 3 position when it is desired to institute a cleaning cycle.

Actuator 42 is shown to be energized by the output of OR gate 75. The three input control commands for gate 75, any one of which is capable of automatically instituting a cleaning cycle, one high speed tape movement on conductor 76, read failure detected on conductor 77, and read-after-write failure detected on conductor 78. Manual nonautomatic command for cleaning is accomplished by the use of a manual switch, on conductor 79. Member 41 includes guides 45-47 and carries cleaning means in the form of a ribbon of cleaning material 44. This ribbon is guided to form a loop which extends transverse to the tape path, as the ribbon is guided to form a loop around stationary member 43 by the guides formed in movable member 41.

The magnetic tape path, including threading path 13 of FIG. 1, includes as an integral part thereof a channel 48 formed in stationary member 43. Thus the loop of cleaning ribbon 44 extends transverse to the tape path and in fact encircles the length of tape 24 as shown in FIG. 1.

Figure 4:
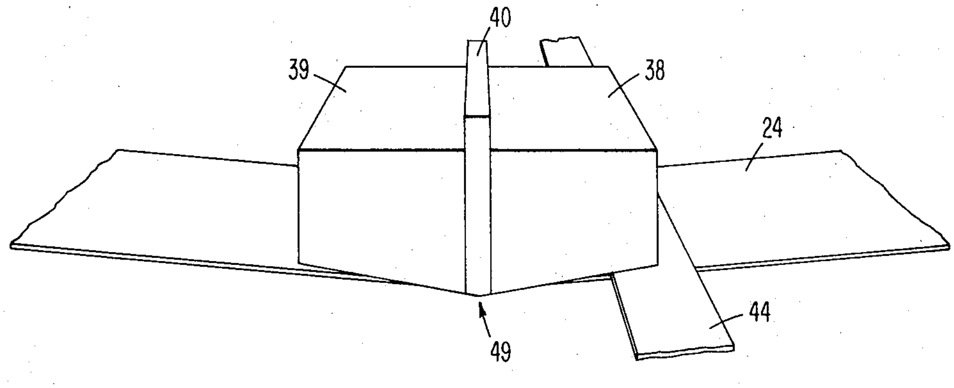
FIG. 4 shows the head/tape interface with the cleaning means of FIGS. 1–3 in inoperative position.
Figure 5:
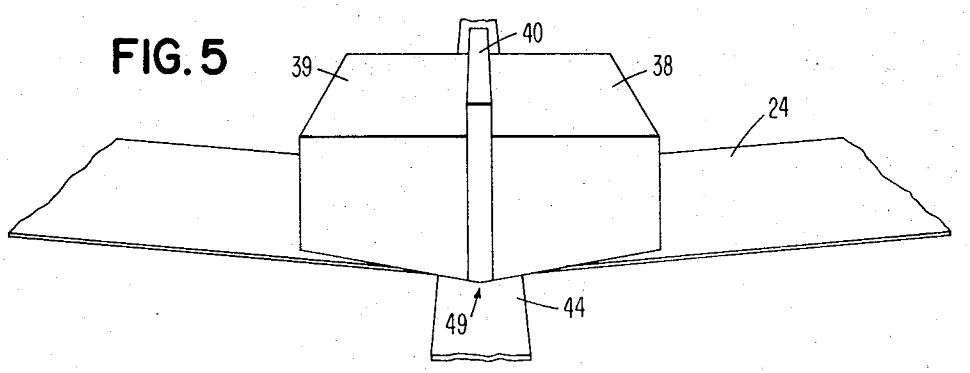
FIG. 5 shows the cleaning means of FIG. 4 in operative position.

FIG. 4 shows head/tape interface 49 with a section of cleaning ribbon 44 disposed in the inoperative position of FIG. 2. FIG. 5 discloses cleaning ribbon 44 disposed at the operative position, in the head/tape interface to separate the tape from the head, as shown in FIG. 3. In the FIG. 5 position, ribbon 44 is force-biased against the head by means of the same force-bias means which normally holds the tape against the head in transducing relation, as in FIG. 4. While the force-bias means shown is tape tension produced by bowing the tape as it passes over the head, the present invention finds utility with other force-bias means, for example a pressure pad on the opposite side of magnetic tape 24 from the head, to hold the tape against the head.

Figure 6:
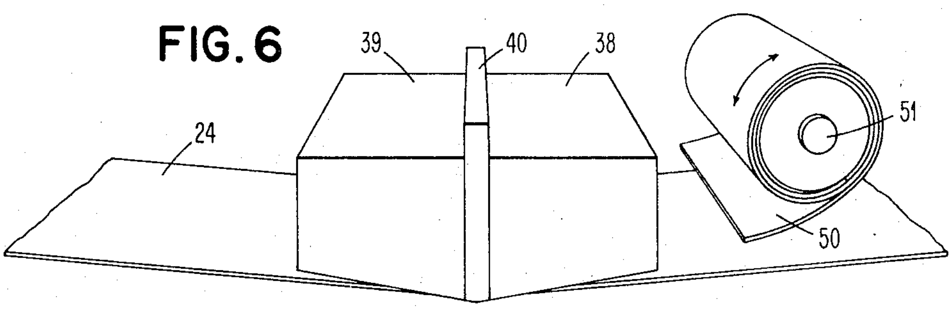
FIG. 6 shows an embodiment of the present invention wherein the cleaning means takes the form of a cleaning ribbon whose loose end is adapted to be drawn into the head/tape interface by means of tape movement.

FIG. 6 discloses an embodiment of the present invention wherein the cleaning means takes the form of a cleaning ribbon 50, much like ribbon 44 above described, whose loose end is held out of contact with tape 24 and is adapted to be lowered onto magnetic tape 24 by clockwise rotation of shaft 51. Once lowered, cleaning ribbon 50 is drawn to the left into the head/tape interface by means of right-to-left movement of the tape. By positioning the ribbon to the left of the transducer, the ribbon is drawn into the head/tape interface by left-to-right movement of the tape. In the FIG. 6 embodiment of the present invention, the cleaning apparatus is shown in its inoperative position. In the operative position, a portion of ribbon 50 is interposed at the head/tape interface to perform the cleaning function. At the end of the cleaning cycle, the tape is restored to the inoperative position by counterclockwise rotation of shaft 51, restoring the tape to its FIG. 6 position where its loose end is positioned out of the tape path.

Figure 7:
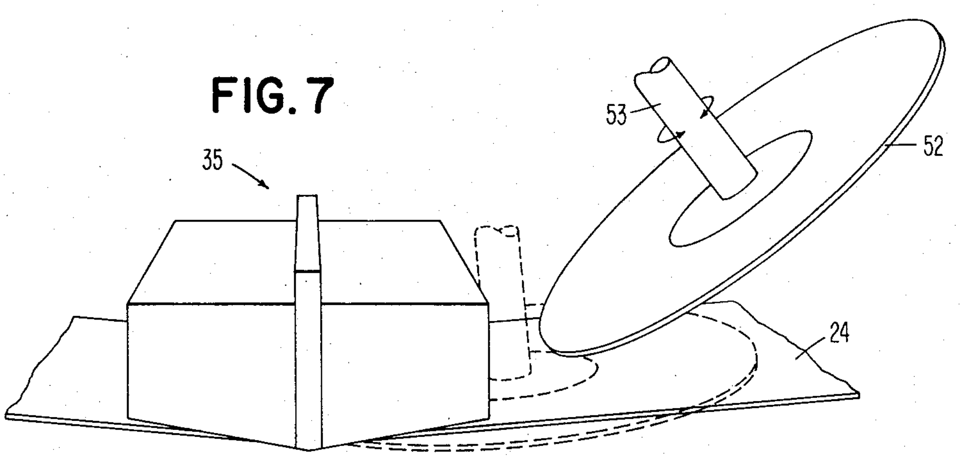
FIG. 7 shows an embodiment of the present invention wherein the cleaning means takes the form of a flexible cleaning disk or brush which is adapted to be moved to left into the head/tape interface.

FIG. 7 shows a further embodiment of the present invention wherein the cleaning apparatus includes cleaning means in the form of a cleaning disk or brush 52 supported for rotation by shaft 53. In this embodiment of the invention, the solid line showing of the cleaning apparatus is the inoperative position and the dotted line showing is the operative position. In the operative position, disk 52 may be rotated about the axis defined by shaft 53.

Figure 8:
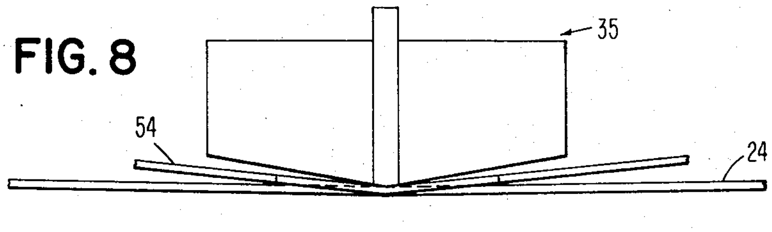
FIG. 8 shows an embodiment of the present invention wherein the cleaning means takes the form of a discontinuous cleaning ribbon which is looped to extend in the same direction as the tape, the position shown being the inoperative position wherein an opening in the ribbon coincides with the head/tape interface.
Figure 9:
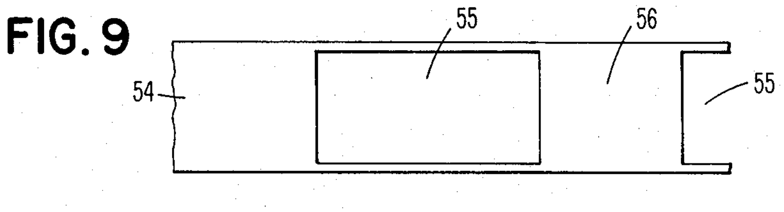
FIG. 9 is a top view of the discontinuous cleaning ribbon of FIG. 8.

FIG. 8 shows an embodiment of the present invention wherein the cleaning means again takes the form of a cleaning ribbon 54 which moves from right to left, leaving a supply reel and accumulating on a take-up reel, not shown, to perform its cleaning function. In the FIG. 8 embodiment of the present invention, the cleaning apparatus is constructed to establish a path for ribbon 54 whereby a portion of the ribbon moves in the same general path as magnetic tape 24. However, in this embodiment, the cleaning ribbon takes the form of a discontinuous ribbon, shown in FIG. 9, wherein ribbon 54 includes spaced openings 55. When the cleaning apparatus is in its inoperative position, shown in FIG. 8, an opening 55 in the ribbon coincides with the head/tape interface and the interface is operational for transducing action. When a cleaning cycle is to be instituted, cleaning ribbon 54 is advanced a short distance, right to left, and a solid portion 56 of the ribbon is moved into the head/tape interface to perform its cleaning function.

It will be noted that in the above-described embodiments of the present invention, the force-biasing means which is operable to hold magnetic tape 24 against transducer 35 in normal transducing relationship is also operable to hold the cleaning means, whatever its configuration, against the head as the cleaning means is moved into operative position at the head/tape interface.

While the term cleaning means is to be broadly construed and may take any form wherein cleaning is accomplished by wiping action with little or no abrading, a specific example is to form ribbons 44, 50 and 54, and disk 52 out of a nylon fabric having bound or treated edges to minimize lint.

The FIG. 1–5 and FIG. 8–9 embodiments of the present invention preferably include cleaning ribbon supply and take-up reels. An exemplary ribbon supply and take-up structure will be described with reference to the FIG. 1–5 embodiment, it being recognized that a similar structure, with a modified ribbon path, would preferably be used with the FIG. 8–9 embodiment.

Figures 10, 13:
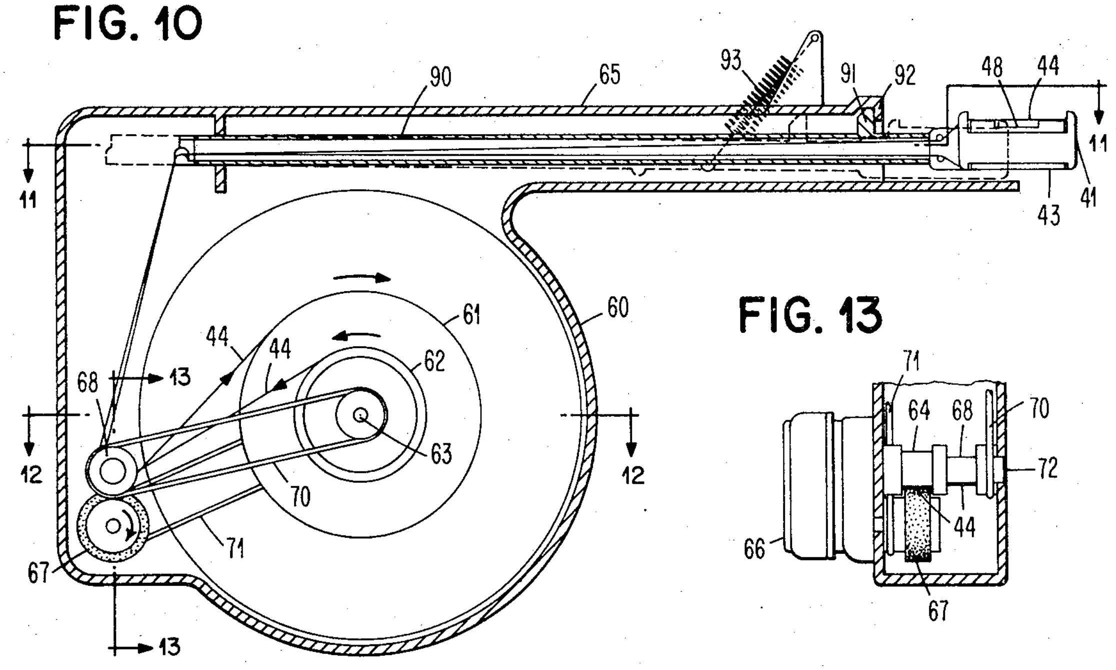
FIG. 10 is a side view of that portion of the cleaning apparatus of FIG. 1 which is contained within the magnetic tape unit of FIG. 1, showing the cleaning ribbon storage and take-up reels, the motor which increments the cleaning web, and showing the path of the cleaning web, the dotted line position being the retracted position of the cleaning apparatus to which it may be manually moved and held for servicing of the tape unit.
FIG. 13 is a section view of the motor drive portion of FIG. 10 taken along the line 13—13.

Referring to the embodiment of the present invention disclosed in FIGS. 1–5, cleaning ribbon 44 may be supplied from an arrangement which is contained within the housing of the magnetic tape unit of FIG. 1. Such an arrangement is shown in FIGS. 10–13. FIG. 10 is a side view and discloses a housing having portion 60 which encloses a supply reel 62 and a take-up reel 61. These reels are individually mounted for rotation on shaft 63. Cleaning ribbon 44 leaves supply reel 62, passes over stationary shaft 68 (FIG. 13), and passes through an elongated channel-like portion 65 of the housing to the portion of the cleaning apparatus disclosed in FIGS. 1–5.

Figure 11:
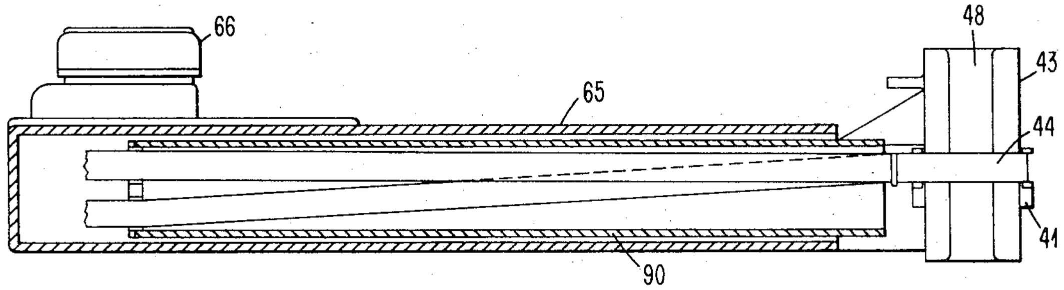
FIG. 11 is a top section view of the apparatus of FIG. 10 taken along the line 11—11.
Figure 12:
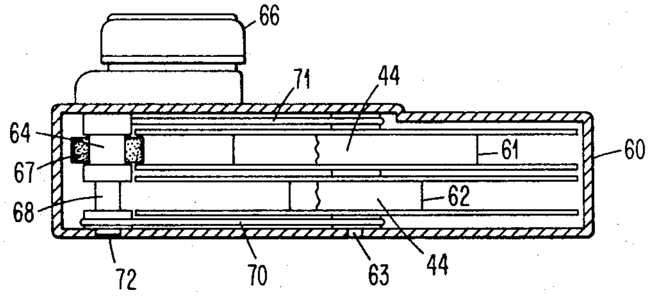
FIG. 12 is a section view of the reel portion of FIG. 10 taken along the line 12—12.

With reference to FIGS. 11–13, an electric motor 66 is connected to drive wheel 67. This wheel has a resilient surface and imprisions cleaning tape 44 between wheel 67 and capstan 64. Capstan 64 freely rotates on shaft 68. Motor 66 may be connected to be energized with energization of cleaning actuator 42 (FIG. 1). So long as motor 66 is energized, cleaning ribbon 44 moves at a relatively slow rate of 0.1 inch per minute. Since supply reel 62 may contain from 200 to 500 feet of cleaning ribbon this slow movement of the ribbon allows many months of unattended automatic cleaning to be performed prior to replacement of the ribbon.

Proper tension is maintained in the ribbon path by virtue of the manner in which the cleaning ribbon is driven by capstan 64 as it enters take-up reel 61 and by the manner in which it is pulled from supply reel 62.

Energization of motor 66 produces clockwise rotation of drive wheel 67, as shown in FIG. 10. This drive wheel rotation also causes take-up reel 61 to be driven in a clockwise direction by virtue of spring drive belt 71. Drive belt 71 applies this clockwise rotational force to take-up reel 61 at a relatively short radius. However, rotation of drive wheel 67 does not supply sufficient cleaning ribbon to take-up reel 61 to accommodate the amount of clockwise rotation desired by movement of drive belt 71. Thus, drive belt 71 slips and the tape extending between capstan 64 and take-up reel 61 is maintained under tension.

As cleaning ribbon 44 moves onto take-up reel 61, it is pulled through the elongated ribbon channel 65 shown in FIG. 11 and is pulled from supply reel 62 after passing over stationary shaft 68, causing counterclockwise rotation of the supply reel. Counterclockwise rotation of reel 62 is resisted by spring drive belt 70, this drive belt having one end coupled to stationary shaft 68. Thus, drive belt 70 slips at reel 62 and the proper ribbon tension is maintained.

Initial adjustment of the cleaning ribbon is facilitated by means of manual clockwise rotation of shaft 68 (FIG. 10) by virtue of opening 72 (FIG. 12) in the side wall of the housing. This rotation of shaft 68 rotates reel 62 clockwise by virtue of drive belt 70 and initially adjusts ribbon tension.

With reference to FIG. 10, the portion 65 of the housing includes a movable and elongated ribbon guide 90, seen in the top view in FIG. 11. Guide 90 includes a rigid tab or pawl 91. Tab 91 is spring-biased into notch or detent 92 formed in the housing by means of spring 93. The portion 41, 43 of the cleaning apparatus can be manually retracted out of the tape path of magnetic tape 24 by pushing portion 41, 43 down and to the left (FIG. 10) to the dotted line position. As soon as portion 41, 43 is released, it automatically returns to the full line position by virtue of the spring bias.

While the invention has been particularly shown and described with reference to preferred embodiments thereof, it will be understood by those skilled in the art that various changes in form and details may be made therein without departing from the spirit and scope of the invention.

What is claimed is:

1. A magnetic tape transport, comprising:
   - operable means adapted to cooperate with magnetic recording tape and subject to degradation of its operation upon experiencing contamination,
   - force-biasing means providing a force tending to hold the tape against said operable means to form an operable interface therewith,
   - cleaning means, and
   - means operable to selectively position said cleaning means intermediate the tape and said operable means at said interface to thereby separate the tape from said operable means.

2. A magnetic tape transport as defined in claim 1 wherein said operable means is magnetic transducer means.

3. A magnetic tape transport as defined in claim 2 including means to move the tape longitudinally past said transducer means.

4. A magnetic tape transport as defined in claim 3 wherein said means to move the tape is operable in a high-speed mode, and means automatically operable to position said cleaning means at said interface during said high-speed mode.

5. A magnetic tape transport as defined in claim 2 wherein said cleaning means includes a cleaning portion, and means producing relative movement between said transducer means and said cleaning portion while said cleaning means is positioned at said interface.

6. A magnetic tape transport as defined in claim 5 wherein said cleaning portion is a ribbon of cleaning material, one surface of which engages said transducer means and the opposite surface of which engages the tape.

7. A magnetic tape transport as defined in claim 6 wherein said means to move the tape is operable in a high-speed mode, and means responsive thereto and automatically operable to position said ribbon at said interface to separate the tape from said transducer means during such high-speed movement.

8. A magnetic tape transport as defined in claim 3 wherein said transducer means includes a write transducer and a read transducer, said read transducer being operable to read data from the tape after it has been written on tape by said write transducer, and means responsive to failure to read-after-write to automatically position said cleaning means at said interface.

9. A magnetic tape transport as defined in claim 2 including a take-up reel, means adapted to support a supply reel, a threading channel including said transducer means, and means operable to automatically thread the tape from the supply reel through said threading channel to said take-up reel, wherein said force-biasing means is tape tension force, and including means supporting said cleaning means adjacent said transducer means.

10. A magnetic tape transport as defined in claim 9 including capstan means to selectively move the tape past said transducer means in a low-speed and a high-speed mode.

11. A magnetic tape transport as defined in claim 10 wherein said transducer means includes a write transducer adapted to write data on the tape when said transport is operating in a write mode, and a read transducer adapted to check proper write operation by thereafter reading the written data; and means responsive to a write failure to stop tape movement, automatically momentarily position said cleaning means at said interface, and thereafter rewriting the portion of the tape associated with said write failure.

12. A magnetic tape transport as defined in claim 11 including means operable to control said capstan means to produce forward tape motion from a supply reel to said take-up reel during a write operation, and means operable upon occurrence of failure to read the written data to control said capstan means in a manner to produce reverse tape movement to thereby automatically clean the portion of the tape associated with the failure.

13. A magnetic tape transport as defined in claim 12 including means operable to control said capstan means in a manner to produce high-speed tape movement, and also operable to automatically position said cleaning means at said interface to thereby separate the tape from said transducer means during said high-speed tape movement.

14. A magnetic tape transport as defined in claim 13 wherein said cleaning means is a ribbon of cleaning material, one surface of which engages said transducer means and the opposite surface of which engages the tape, and means operable to produce relative motion between said ribbon and said transducer means while said ribbon is positioned at said interface.

15. A magnetic tape transport as defined in claim 13 wherein said cleaning means is a ribbon of cleaning material; and including a ribbon supply reel, a ribbon take-up reel and ribbon support means establishing a ribbon loop; and wherein said means operable to position said cleaning means is effective to move a portion of said loop into said interface such that one surface of said ribbon engages said transducer means and the opposite surface of said ribbon engages the tape.

16. A magnetic tape transport as defined in claim 15 including motor means associated with said ribbon and effective to move said ribbon from said ribbon supply reel to said ribbon take-up reel.

17. A magnetic tape transport as defined of claim 16 wherein said ribbon loop extends in the direction of said threading channel, and wherein said ribbon includes at least one opening adapted to be positioned at said interface when said cleaning means is not operably positioned at said interface.

18. A magnetic tape transport as defined in claim 17 wherein said ribbon includes openings spaced along the length of said ribbon.

19. A magnetic tape transport as defined in claim 2 wherein said transducer means includes a read transducer operable to read data from the tape, and means responsive to a read failure to automatically position said cleaning means at said interface.

20. A magnetic tape transport as defined in claim 11 wherein said read transducer is adapted to read data from the tape when said transport is operating in a read mode, and means responsive to a read failure to stop tape movement, automatically momentarily position said cleaning means at said interface, and thereafter re-read the portion of tape associated with said read failure.

21. A magnetic tape transport as defined in claim 2 wherein said cleaning means is a cleaning ribbon having a loose end which is normally positioned out of contact with the tape and is adapted to be moved into contact with the tape to subsequently be moved to said interface by virtue of tape movement.

22. A magnetic tape transport as defined in claim 2 wherein said cleaning means is a cleaning disk having a portion adapted to be moved into said interface.

23. A magnetic tape transport as defined in claim 2 wherein said cleaning means is a discontinuous cleaning ribbon movable in the direction of the tape and having openings formed therein, said ribbon being normally positioned with an opening therein at said interface and being movable to position a solid portion of said ribbon intermediate the tape and said transducer means at said interface.

24. Magnetic information storage apparatus, comprising:

a magnetizable media, write magnetic transducing means having a transducing surface cooperating with said media and adapted to receive electrical information containing signals and to transduce the same to magnetic states in said magnetizable media, read magnetic transducing means cooperating with said media and adapted to transduce said magnetic states to electrical signals, the electrical characteristics of said signals being indicative of proper or improper reading of said magnetic states, and cleaning means automatically controlled by means including said read transducing means and operable to separate said media from the transducing surface of said write transducing means and to automatically clean said surface upon improper reading of said magnetic states.

25. Magnetic information reading apparatus comprising:

a magnetizable media having magnetic states representing information, read magnetic transducing means having a transducing surface cooperating with said media and adapted to transduce said magnetic states to electrical information containing signals, said signals having a characteristic indicative of proper or improper operation reading of said magnetic states, and cleanIng means automatically controlled in accordance with said characteristic and operable to separate said media from the transducing surface of said read transducing means and to automatically clean said surface upon improper reading of said magnetic states.

26. A method of enhancing the writing of data upon magnetic media, comprising the steps of:

moving said media relative to the transducing surface of a magnetic write head while energizing said head with electrical signals to thereby induce magnetic states in said media, monitoring a characteristic of the electrical signals induced in a read head Which cooperates with said media after said magnetic states are induced therein by said write head, said characteristic being indicative of the transducing performance of said write head, and automatically introducing a cleaning means to the transducing surface of said write head upon sensing a degradation in the performance of said write head.

27. The method defined in claim 26 including the step of cleaning that portion oF said media associated with the degraded performance of said read head.

28. A method of enhancing the reading of data from magnetic media comprising the steps of:

moving said media relative to the transducing surface of a magnetic read head, monitoring a characteristic of the electrical signal induced in said read head which is indicative of the transducing performance of said read head, and automatically introducing a cleaning means to the transducing surface of said read head upon sensing a degradation in the performance of said read head.

29. The method defined in claim 28 including the step of automatically cleaning that portion of saId magnetic media associated with the degraded performance of said read head.

* * * * *